(12) United States Patent
Wittenstein et al.

(10) Patent No.: US 8,335,689 B2
(45) Date of Patent: Dec. 18, 2012

(54) METHOD AND SYSTEM FOR EFFICIENT MANAGEMENT OF SPEECH TRANSCRIBERS

(75) Inventors: Andreas Wittenstein, Woodacre, CA (US); David Brahm, The Woodlands, TX (US); Mark Cromack, Santa Ynez, CA (US); Robert Dolan, Santa Barbara, CA (US)

(73) Assignee: COGI, Inc., Santa Barbara, CA (US)

( * ) Notice: Subject to any disclaimer, the term of this patent is extended or adjusted under 35 U.S.C. 154(b) by 546 days.

(21) Appl. No.: 12/587,894

(22) Filed: Oct. 14, 2009

(65) Prior Publication Data

US 2011/0087491 A1    Apr. 14, 2011

(51) Int. Cl.
*G10L 15/26* (2006.01)

(52) U.S. Cl. .................. 704/235; 704/231; 704/276

(58) Field of Classification Search .................. 704/235, 704/240, 270, 9, 10, 257, 231, 276, 270.1; 705/7.22
See application file for complete search history.

(56) References Cited

U.S. PATENT DOCUMENTS

| | | | | |
|---|---|---|---|---|
| 6,298,326 | B1* | 10/2001 | Feller | 704/270 |
| 6,578,007 | B1* | 6/2003 | Howes et al. | 705/7.22 |
| 2004/0204941 | A1* | 10/2004 | Israch et al. | 704/240 |
| 2008/0319744 | A1* | 12/2008 | Goldberg | 704/235 |

* cited by examiner

*Primary Examiner* — Huyen X. Vo
(74) *Attorney, Agent, or Firm* — Mark Rodgers

(57) ABSTRACT

A method and system for improving the efficiency of speech transcription by automating the management of a varying pool of human and machine transcribers having diverse qualifications, skills, and reliability for a fluctuating load of speech transcription tasks of diverse requirements such as accuracy, promptness, privacy, and security, from sources of diverse characteristics such as language, dialect, accent, speech style, voice type, vocabulary, audio quality, and duration.

7 Claims, 10 Drawing Sheets

Fig. 9

| Transcription Job Specification 706 |
|---|
| Job Scope 901 |
| Conversation Identifier 902 |
| Job Requirements 903 |
| Requester Identifier 904 |
| others 905 |

Fig. 10

| Job Requirements 903 |
|---|
| Accuracy Specification 1001 |
| Promptness Specification 1002 |
| Privacy Specification 1003 |
| Security Specification 1004 |
| Transcriber Pool 1005 |
| Transcriber Preferences 1006 |
| others 1007 |

Fig. 11

| Accuracy Specification 1001 |
|---|
| Quality Level 1101 |
| Maximum Error Rate 1102 |
| Exception Dictionaries 1103 |
| others 1104 |

Fig. 12

| Promptness Specification 1002 |
|---|
| Priority Level 1201 |
| Deadline 1202 |
| others 1203 |

Fig. 13

| Privacy Specification 1003 |
|---|
| Private Flag 1301 |
| Secret Flag 1302 |
| User Data 1303 |
| others 1304 |

Fig. 14

| Security Specification 1004 |
|---|
| Security Classification 1401 |
| Protocol Identifier 1402 |
| Key Identifiers 1403 |
| User Data 1404 |
| others 1405 |

Fig. 15

| User Profile 1500 |
|---|
| Real Name 1501 |
| Nicknames 1502 |
| Contact Numbers 1503 |
| Pilot Numbers 1504 |
| User ID 1505 |
| Passwords 1506 |
| Billing Information 1507 |
| Speech Profiles 1508 |
| Gender 1509 |
| Birthdate 1510 |
| Transcription Statistics 1511 |
| Relationships 1512 |
| others 1513 |

Fig. 16

| Speech Profile 1508 |
|---|
| Noise Profile 1601 |
| Dialect Profile 1602 |
| Voice Profile 1603 |
| others 1604 |

Fig. 17

| Transcriber Profile 207 |
|---|
| Contact Information 1701 |
| Payment Information 1702 |
| Schedule 409 |
| Performance Data 110 |
| Skill Profiles 1703 |
| Speech Profiles 1704 |
| Exception Dictionaries 1705 |
| others 1706 |

US 8,335,689 B2

METHOD AND SYSTEM FOR EFFICIENT MANAGEMENT OF SPEECH TRANSCRIBERS

RELATED APPLICATIONS

This application claims priority to US Provisional application, express mail label EB 820551640, filed Oct. 15, 2008

BACKGROUND OF THE INVENTION

Most of the linguistic information most people communicate is in the form of speech, and most people can speak much faster than they can communicate linguistic information by any other means. Yet most people can read much faster than they can understand speech, even if the speech is recorded and artificially sped up without pitch distortion. And whereas recorded textual information can be visually scanned and searched with great ease and rapidity, searching or scanning recorded speech is painfully tedious, a discrepancy exacerbated by today's networked computer systems, which make it possible to search enormous quantities of textual data in an instant, yet are useless at interpreting voice data. Compared to speech, text is also far easier to edit, organize, and process in many other ways.

Accurate, fast, and affordable speech transcription could bridge the advantages of speech and text; however, no existing solution meets all three of these criteria. Trained human dictation typists set the standard for accuracy, but are slow and expensive. Skilled human stenographers are faster, but take a much longer time to train and master, the output of their stenotype machines is ambiguous, and they cost even more than dictation typists. Automatic speech recognizers are the most affordable, but their accuracy for normal conversational speech of most speakers in most situations is, in the current state of the art, unacceptably low for most purposes. Trained human voicewriters substitute their clearly enunciated speech as input to automatic speech recognizers, and correct the remaining errors in the output, thereby matching the accuracy of typists while retaining much of the speed of automatic speech recognition; but trained voicewriters are also even more expensive than dictation typists.

The high cost of dictation typists and voicewriters reflects the paucity of interested people with the requisite linguistic ability and hearing acuity, compounded by the long training duration it takes to acquire the vocabulary, accuracy, and speed necessary for real-time transcription. Dictation typing additionally requires excellent manual dexterity and spelling aptitude; while voicewriting additionally requires excellent oral dexterity and elocutionary aptitude, as well as the development of the necessary computer operation skills. Proficiency in voicewriting, unlike typing, also entails a mutual adaptation in which the voicewriter is trained to speak so as to be accurately understood by the speech recognizer while the speech recognizer is trained to accurately understand the voicewriter. In fact, the speech recognizer must also continue to learn new vocabulary and syntactic constructions along with the voicewriter. The obscurity of the voicewriting profession and the rarity of educational programs training the art have further limited the talent pool.

SUMMARY OF THE INVENTION

The present invention is a method and system for improving the efficiency of speech transcription by automating the management of a varying pool of human and machine transcribers having diverse qualifications, skills, and reliability for a fluctuating load of speech transcription tasks of diverse requirements such as accuracy, promptness, privacy, and security, from sources of diverse characteristics such as language, dialect, accent, speech style, voice type, vocabulary, audio quality, and duration. In particular, the present invention maintains a database of part-time and full-time transcribers and tracks each transcriber's accuracy, availability, readiness, speed, endurance, reliability, security clearance, cost, and transcribing skills for transcription tasks of various linguistic and paralinguistic characteristics; maintains a database of transcribees and tracks their linguistic and paralinguistic characteristics, transcription request statistics, and subscription status; maintains a database of transcription tasks and their associated dynamic linguistic and paralinguistic characteristics; forecasts the transcription workload and resource availability; recruits and trains resources as necessary in order to ensure availability of sufficient resources of all types at all times; and breaks down transcription jobs into transcription tasks which it parcels out to available transcribers in such a way as to minimize overall costs while meeting the required transcription accuracy, promptness, privacy, and security.

BRIEF DESCRIPTION OF THE DRAWINGS

The invention will be better understood by referring to the accompanying drawings

FIG. 9 is a data diagram of a transcription job specification record.

FIG. 10 is a data diagram of a transcription job requirements record.

FIG. 11 is a data diagram of an accuracy specification record.

FIG. 12 is a data diagram of a promptness specification record.

FIG. 13 is a data diagram of a privacy specification record.

FIG. 14 is a data diagram of a security specification record.

FIG. 15 is a data diagram of a user profile record.

FIG. 16 is a data diagram of a speech profile record.

FIG. 17 is a data diagram of a transcriber profile record.

DETAILED DESCRIPTION OF THE INVENTION

In the following description of a system and method for improving the efficiency of speech transcription, numerous specific details, such as specific readiness levels, job requirements, source characteristics, and system components are set forth in order to provide concrete examples to facilitate a more thorough understanding of the present invention. To those skilled in the art, however, it will be apparent that the present invention may be practiced without these specific details. Moreover, certain well-known features have been described only in general terms, so as not to unnecessarily obscure the present invention.

Figure 1:
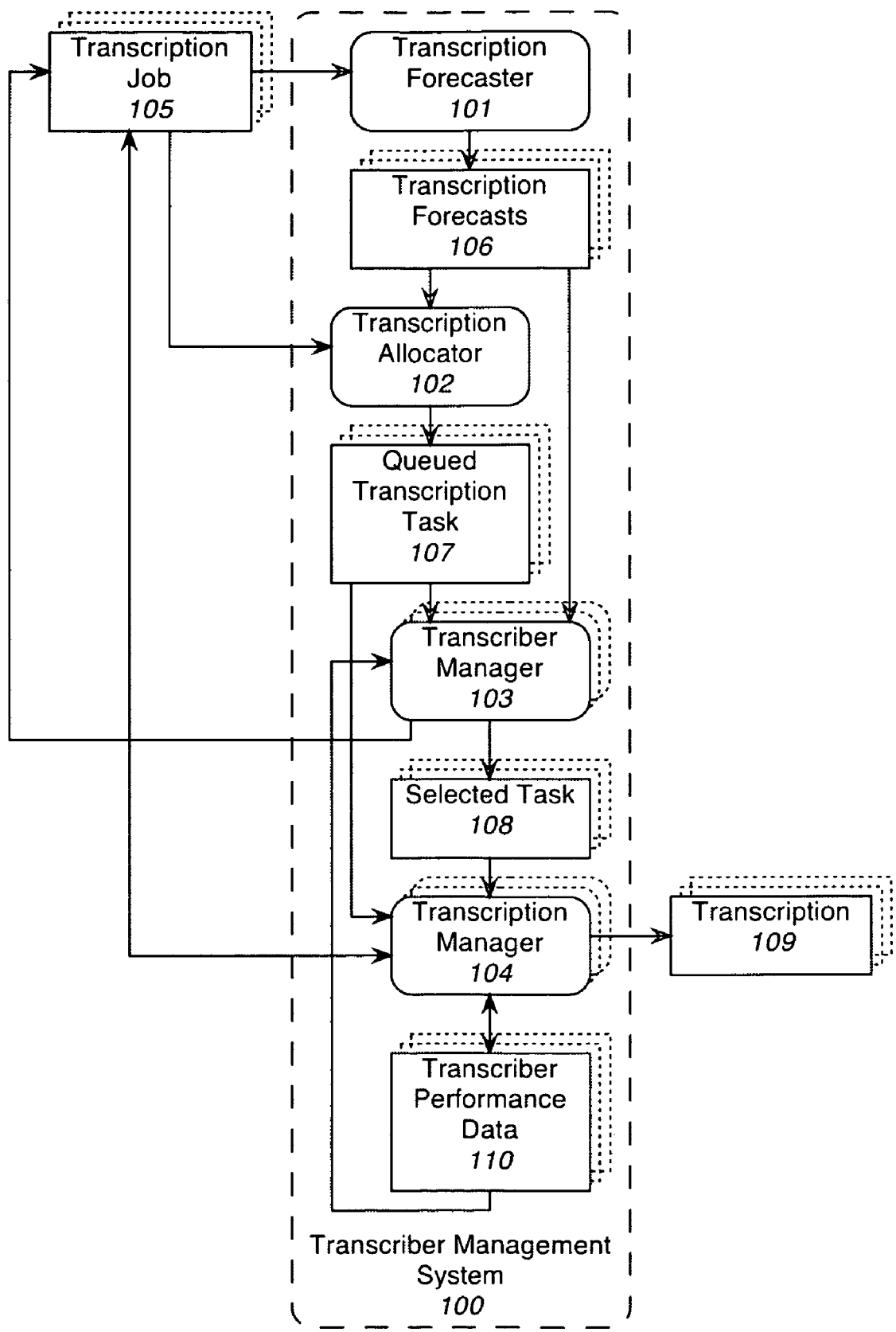
FIG. 1 is a top-level information-flow diagram of the transcriber management system.

As shown in top-level information-flow diagram FIG. 1, the transcriber management system 100 disclosed herein comprises transcription forecaster 101, transcription allocator 102, one or more transcriber managers 103, and one or more transcription managers 104. Transcriber management system 100 uses these components to maximize the efficiency of a varying pool of human and machine transcriber resources of diverse skills and qualifications to transcribe speech of diverse dialects, voice types, audio quality, duration, and other source characteristics in a fluctuating load of transcription jobs 105 with diverse accuracy, promptness, privacy, security, and other requirements, into transcriptions 109.

Figure 4:
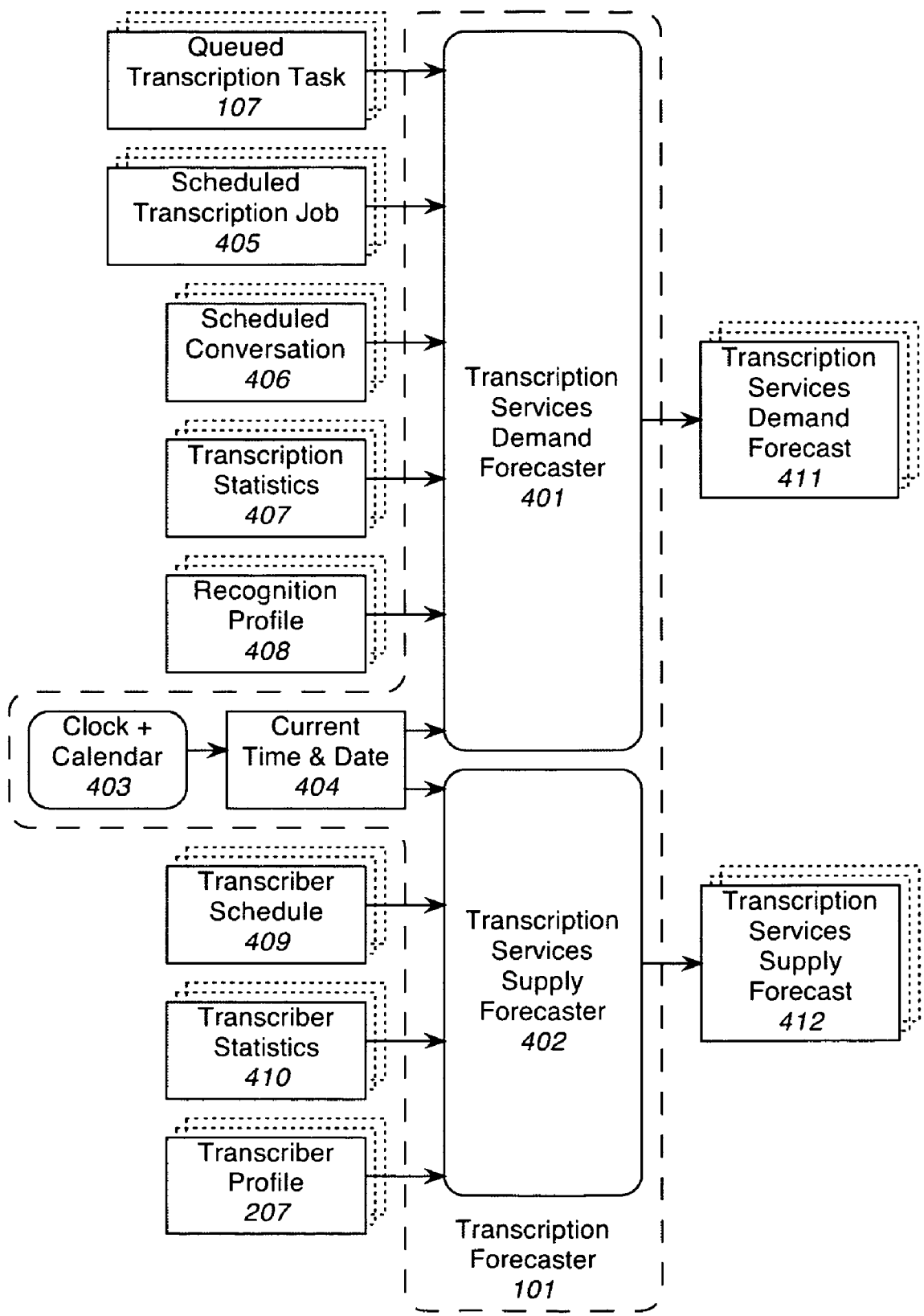
FIG. 4 is an information-flow diagram of the transcription forecaster.

Transcription forecaster 101 computes transcription forecasts 106 for different time-horizons of the demand for transcription services of different requirements and source characteristics and the supply of transcriber resources providing those services, based on previous and scheduled transcription jobs 105 and other information, Transcription forecaster 101 is described further under FIG. 4.

Transcription allocator 102 breaks down scheduled transcription jobs 105 hierarchically into tasks that can be performed by individual transcribers or teams of transcribers having different classes of skills, schedules, and costs; optimizes the prioritization, scheduling, and distribution of scheduled and forecast transcription tasks among the forecast transcribers so as to minimize the overall cost while meeting all the requirements for the scheduled and forecast transcription jobs; and enters the scheduled transcription tasks into a queue as queued transcription tasks 107. Transcription allocator 102 is described further under FIG. 6.

A transcriber manager 103 filters the queue of transcription tasks 107 as appropriate for the respective transcribers; presents the filtered queues to the transcribers, permits each transcriber to select one task 108 at a time; monitors the status of each transcriber; recruits and derecruits transcribers of different skills and readiness levels as necessary according to transcription forecasts 106; tracks the work done by the transcribers as reported in transcriber performance data 110 by transcription manager 104, and pays and otherwise rewards the transcribers accordingly; and creates new transcription jobs to train transcribers in skills forecast to be needed in transcription forecasts 106.
Transcriber manager 103 is described further under FIG. 2.

A transcription manager 104 presents transcription tasks 108 to one or more transcribers for transcription; tracks the transcribers' progress, speed, and accuracy, and updates transcriber performance data 110 accordingly; and merges the transcribed utterances deriving from the same transcription job into a single coherent transcription. Transcription managers 104 are described further under FIG. 15.

Transcription jobs 105 may be requested by conversation attendees at any time during or after the conversation, via manual or spoken command or any other available modality. During the conversation, an attendee can request transcription of a predefined duration of speech centered on a predefined offset from the current time, with predefined transcription requirements, by issuing a single transcribe command, for example by uttering the command as a single word, or by pressing a single button such as a DTMF button on a telephone, a key on a computer keyboard, or a virtual button in a graphical user interface. Alternatively, an attendee can request transcription of an indefinite duration of speech by issuing two commands: a start command and a stop command, at predefined offsets from the beginning and end, respectively, of the passage to be transcribed, to enter and exit transcription mode, where again each command may be issued as a simple word or button press, where the start and stop commands may be identical, and where the state of being in transcription mode may be indicated by a special tone or special distortion of the audio or by a light or other indicator in a graphical user interface. The requester may later adjust the offset and duration of the single-command transcription request or the start and stop offsets of the two-command transcription request, and the system adapts the requester's preferences by adjusting the duration and offset parameters slightly in the direction of the requester's adjustments. Alternatively, the requester can specify the portion to be transcribed with more-complex commands explicitly giving the time and duration or the start and end times. Similarly, the requester can also explicitly specify the other job requirements, including accuracy, promptness, privacy, and security, on a case-by-case basis using more-complex commands. Transcription job requirement specifications are described in more detail under FIG. 10.

Figure 2:
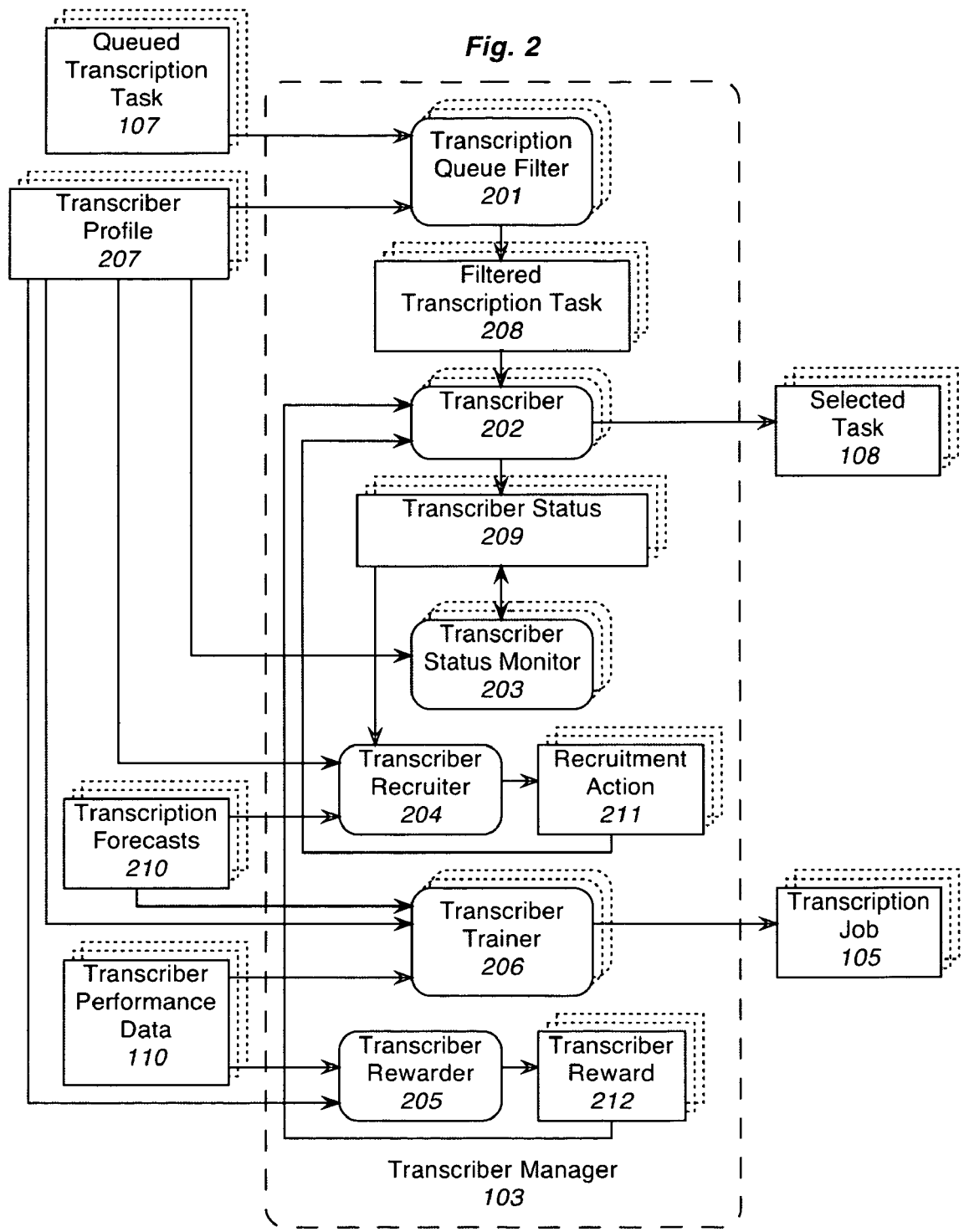
FIG. 2 is an information-flow diagram of the transcriber manager.

As shown in information-flow diagram FIG. 2, transcriber manager 103 comprises transcription queue filters 201, transcribers 202, transcriber status monitors 203, transcriber recruiter 204, transcriber rewarder 205, and transcriber trainers 206.

A transcription queue filter 201 culls queued transcription tasks 107 so that each transcriber is only offered appropriate tasks 208 as determined by comparing the qualifications, skills, and costs listed in the transcriber's profile 207 with the specifications given in the queued transcription tasks 107 by transcription allocator 102. A transcriber 202 may be a human dictation typist, a machine speech recognizer, a human voicewriter using a machine speech recognizer, a human proofreader, a human scopist, a machine text corrector, an interpreter, a human or machine translator, or any other resource that helps convert the source speech into the desired transcription.

A transcriber status monitor 203 monitors the status 209 of transcribers—whether they are busy, active, onduty, on-call, registered, and so on. Transcriber status monitors 203 are described further under FIG. 3. The transcriber recruiter 204 recruits and derecruits transcribers as needed to ensure an adequate supply of transcribers of different skills, qualifications, and readiness levels to meet current and projected demands at different time horizons, as determined by analyzing transcriber status records 209, and the skills, qualifications, and schedules listed in transcribers' profiles 207, and comparing those with the current transcription forecasts 210. Transcriber recruiter 204 is described further under FIG. 5.

The transcriber rewarder 205 tracks the work done by transcribers, as recorded in transcriber performance data records 110, and rewards them (or their owners, in the case of machine transcribers) with earned wages, bonuses, and other rewards 212, in accordance with the pay rate listed in transcriber profiles 207, tax rates, and other information. Transcriber trainer 206 analyzes the accuracy and speed of transcribers' transcriptions, recorded in transcriber performance data records 110, as a function of the source characteristics of the material transcribed, and selects prior transcription jobs for training accordingly, in order to help transcribers improve their accuracy and speed in the transcription skills projected in transcription forecasts 210 to be needed most, including dialects, voice types, and noise types, with paid or unpaid on-the-job training. The prior transcription jobs used for training may include real transcription jobs requested by clients in the past, as well as artificial transcription jobs created expressly for training purposes. The transcriber recruiter trains human transcribers in basic transcription skills with automated transcription training software, and trains them in specific skills by having them transcribe actual utterances needing those skills, comparing their results with those of experts in those skills, including corrections by the transcribes and other conversation attendees where available, and giving them appropriate feedback. The transcriber recruiter trains machine transcribers by loading the machines with the requisite software, with the help of their operators as needed, and either loading the requisite language and speaker models, if available, or running the desired training utterances and transcriptions through them, bootstrapping speaker-independent speech-recognizer models with data from manual and speaker-independent transcriptions. For both human and machine transcribers, training is a constant ongoing activity, as more training data become available and as languages change, especially through the constant addition of new vocabulary.

Figure 3:
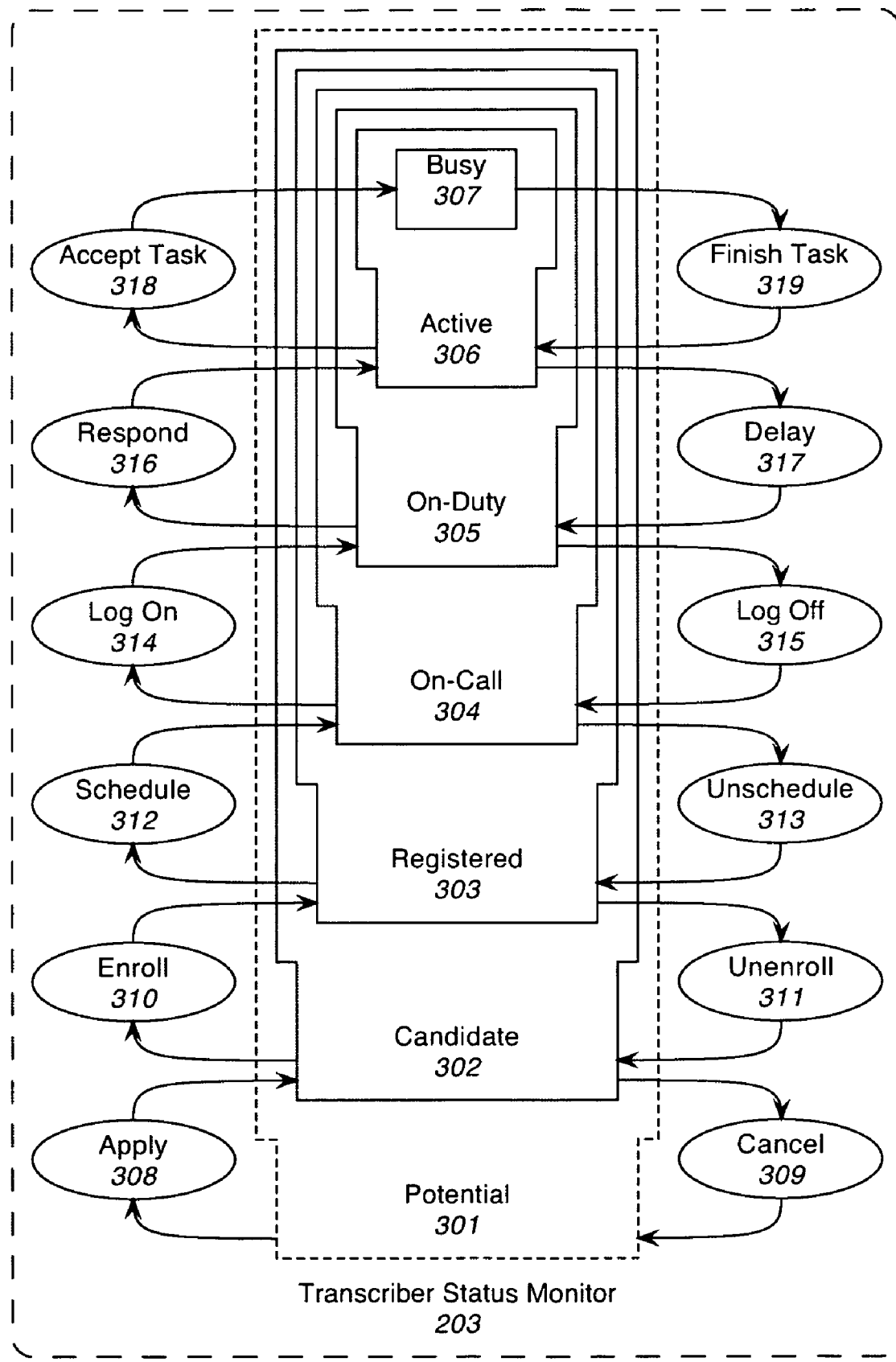
FIG. 3 is a state diagram of the transcriber status monitor.

As shown in state diagram FIG. 3, transcriber-status monitor 203 automatically tracks the readiness level 301 . . . 0307 of a transcriber by that transcriber's actions 308 . . . 0319 and scheduled availability. The transcriber readiness levels may include potential 301, candidate 302, registered 303, on-call 304, on-duty 305, active 306, and busy 307, of which the candidate level is the lowest-level state tracked, and busy is the highest. Higher readiness levels are nested within lower levels, in the sense that all busy transcribers are active, all active transcribers are on-duty, all on-duty transcribers are on-call, all on-call transcribers are registered, and all registered transcribers are candidates.

As defined here, a busy transcriber 307 is one currently transcribing an utterance for the transcription system. An active transcriber 306 is either busy transcribing an utterance for the system or has sufficiently recently transcribed an utterance, responded to a prompt from the system, or logged on to likely be immediately available to transcribe an utterance. An on-duty transcriber 305 is scheduled to be currently transcribing and is currently logged on to the transcription system, and is thus either active or likely to respond within less than a minute or so to a request to transcribe an utterance. An on-call transcriber 304 is either on-duty or is scheduled to be available, and is able to be contacted to stand by for a request to transcribe an utterance within less than an hour or so. A registered transcriber 303 is one whose transcription skills are known to the system and is available in principle to transcribe utterances, and is either on-call or can be contacted with a request to schedule time to transcribe utterances. A candidate transcriber 302, if not already registered, is one which is known to be interested and available and which the system can contact, evaluate, and enroll. A potential transcriber 301 is either a known candidate or an unknown person or system which can potentially be recruited. The specific recruitment delays and readiness levels listed here are meant as examples; other durations and additional or fewer readiness levels may be used as appropriate. When potential transcribers 301 apply 308 to transcribe for the transcription system, the transcriber status monitor 203 begins to track them as candidates 302; and when candidates become unreachable or explicitly cancel 309 their membership, the status monitor ceases tracking them. When candidate transcribers 301 enroll 310 to transcribe utterances, the status monitor increases their readiness level to registered 303; and when registered candidates unenroll 311, their level falls back to candidate. When registered transcribers 303 indicate in their schedules that they are potentially available 312 to transcribe utterances, their readiness level increases at the scheduled times to on-call 304; and at the end of the scheduled times it falls back 313 to merely registered. When on-call transcribers 304 log on 314 to the transcription system, either at a time designated in their schedules for transcription service or when explicitly indicating their availability, the status monitor increases their readiness level to on-duty 305; and when their scheduled work time elapses or they log off 315, the level drops back to merely oncall.

When on-duty transcribers 305 first log on or later respond to a prompt 316 by the status monitor, their readiness rises to active 306; and after a short delay without further response 317, it drops back to merely on-duty. When an active transcriber 306 accepts a transcription task 318 from the system, the status monitor raises the transcriber's readiness level to busy 307; and when the task is completed 319 or given up on, the monitor drops the level back to merely active.

Note that, because the readiness levels are nested states, the status monitor can summarily drop a transcriber by more than one level. For example, if a busy transcriber 307 gets distracted, doses off, or for some other reason delays too long in the middle of a transcription, the monitor decreases that transcriber's readiness level to on-duty, and the transcriber management system immediately inserts the untranscribed remainder of the utterance into the queue for another transcriber to complete. As another example, if a busy transcriber 306 logs off, whether intentionally or due to a power failure, hardware or software failure, network glitch, or some other inadvertent reason, the monitor automatically decreases the transcriber's readiness level to on-call. In general, the transcriber management system is designed to treat all resources as unreliable, in order to deal with such common problems as the failure of software, hardware, and networks; and of human transcribers forgetting to log off, being distracted from their rendering job, or working at an uneven pace. As shown in information-flow diagram FIG. 4, transcription forecaster 101 comprises transcription services demand forecaster 401, transcription services supply forecaster 402, and clock+calendar 403. Transcription forecaster 101 is run iteratively at the rates required by the transcriber recruiter 204 (FIG. 2) for recruiting transcribers and other transcription infrastructure to different stages of readiness. Since the actual breakdown of transcription jobs into transcription tasks and the distribution of those tasks among transcribers, as allocated by transcription allocator 102 (FIG. 1), directly affects the current and short-term demand for different types of transcription tasks as well as the current and short-term supply of transcribers of different skills and readiness levels, the iterative short-term transcription forecasting is important to refine the estimates of transcription demands and transcriber supplies. Moreover, the forecasts produced by transcription forecaster 101 directly affect the optimal transcription breakdown and distribution determined by transcription allocator 102, which must maintain an adequate reserve of transcribers of different skills to handle peak demand.

Transcription services demand forecaster 401 forecasts the demand for transcription services of different types 411 on the basis of queued transcription tasks 107; scheduled transcription jobs not yet broken down into tasks and distributed 405; scheduled conversations (which include all in-progress conversations), portions of which may require transcription 406; statistics of past demand for transcription of different types 407; recognition profiles of transcribees of scheduled transcriptions and potential transcribees of scheduled conversations 408; and the current date and time 404, as output by calendar+clock 403.

Transcription services supply forecaster 402 forecasts the supply of transcribers capable of providing transcription services of different types 412 on the basis of the transcribers' schedules 409; statistics of past availability, reliability, and efficiency of transcribers of different skill sets 410; transcriber profiles 207; and the current date and time 404, as output by calendar+clock 403.

Since the purpose of the forecasts is to ensure that adequate resources are always available to meet demand, transcription services demand forecasts 411 and transcription services supply forecasts 412 are broken down according to factors affecting the allocation of transcription resources, including requirements such as promptness, accuracy, privacy, and security; and source characteristics such as dialect, voice type, audio quality, and duration. For some transcription services, demand and supply can be forecast with greater confidence than for others, so they require a smaller safety margin to be allocated, recruited, and trained. Thus queued transcription tasks 107 constitute fairly certain demands for tasks of known requirements, and fairly certain source characteristics, although the actual time it will take to transcribe them can only be estimated. Unallocated transcription jobs 405 also have known requirements, but they may still be cancelled, and their source characteristics may not yet have been analyzed, instead being merely probabilistically inferred from the conversation attendees' profiles 408. Scheduled conversations 406 may have their transcription requirements changed before transcription of any of their contents is requested, and for known attendees most of the source characteristics are quite predictable from their profiles 408, and for recurrent scheduled conversations even the durations of transcription jobs may be predictable.

The least predictable demands for transcription services are associated with unscheduled conversations, whose number, transcription requirements, and source characteristics can only be roughly forecast from past statistics 407. For anticipated unscheduled conversations, transcription services demand forecaster 401 applies time-series forecasting methods. In particular, it takes into account the strong hourly, daily, monthly, and yearly periodicities of conversations requiring transcription services, as determined by the time zones and calendars (including complicated holiday periodicities) used by the conversation attendees, which it predicts from the attendees' locations and from the dialects used in the conversation. One of the most common uses of transcription services, for example, is for notes or minutes of business meetings, which are typically scheduled to begin on the hour, during business hours, on work days, with recurrent business meetings usually occurring at the same time each week, month, or year. Economic cycles, political cycles, epidemic diseases, large-scale disasters, and other events and occasions affecting large population segments also influence the demand and supply in predictable ways. Long-term trends in the form of a typical sigmoid adoption curve are expected for each service type, potentially modified by disruptions from competing services. As new users adopt the service and apply it in new ways, the periodic influences are expected to change, so the time-series forecaster weights more recent statistics more heavily. In general, transcription services which have been used more rarely or for a shorter time are less predictable than more commonly requested types with longer histories, so the forecasts become more reliable as time goes on and usage spreads. Likewise, in general, predictability of transcription demand declines into the future.

In general, predictability rises with the state of readiness of the transcriber, with the amount and diversity of speech of the given source characteristics the transcriber has transcribed, and with the length of time that the transcriber has participated in the transcription service. The system tracks all of this information for each registered transcriber, along with the transcriber's reliability, in the transcriber's profile. For machine transcribers, when using the same software on servers configured the same way their behavior is highly predictable, but their predictability declines with divergence in software versions and hardware configuration. Transcription services supply forecaster 402 uses time-series forecasting methods similar to those used by transcription services demand forecaster 401, likewise taking into account patterns in the availability of transcribers with periods of an hour, a day, a week, a month, and a year, tied to the transcribers' time zones and calendars.

Figure 5:
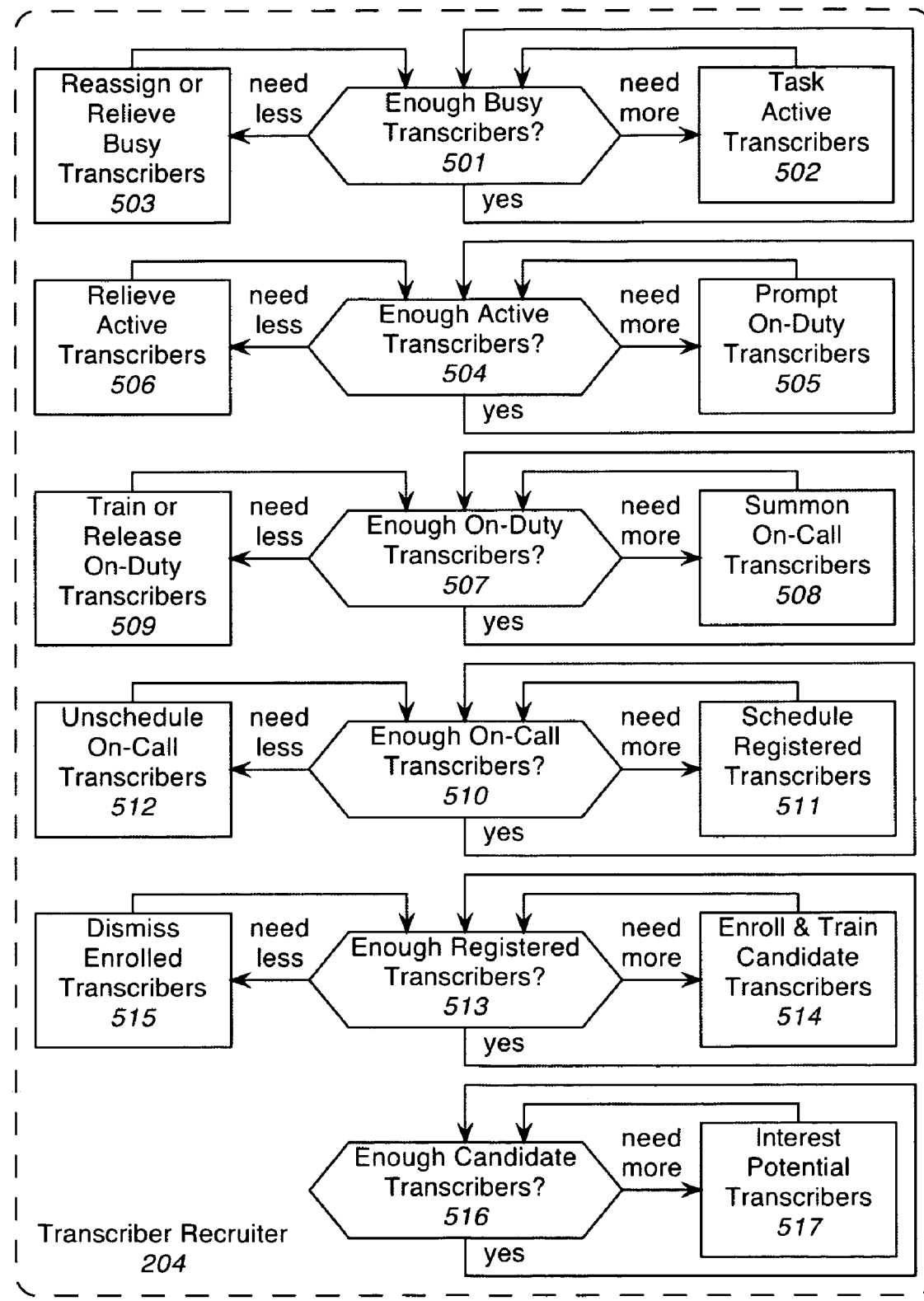
FIG. 5 is a control-flow diagram of the transcriber recruiter.

As shown in control-flow diagram FIG. 5, transcriber recruiter 204 monitors the pool of transcribers at each level of readiness and, in accordance with the forecast demand versus supply, either recruits additional transcribers with the appropriate skill sets from the level below or releases them to the level below. In order to deal with unpredictable fluctuations in demand and supply, the transcriber recruiter maintains a safety margin of surplus transcribers at each readiness level, in accordance with the forecasts.

Thus transcriber recruiter 204 monitors whether the number of transcribers currently busy transcribing material is expected to be sufficient to complete all current transcription tasks in time 501. If not, the transcriber recruiter presents additional current filtered transcription tasks to sufficient additional qualified active transcribers, or interrupts busy transcribers from less-urgent tasks 502. If, on the other hand, there are too many busy transcribers, as could conceivably occur if a large number of in-progress transcription jobs were abruptly cancelled, then the transcriber recruiter accommodates the surplus by allowing the transcribers to complete their voided transcription tasks, presenting the transcribers with other tasks, or relieving them with a rest period 503. In any case, the recruiter checks again a moment later. The transcriber recruiter assigns and deassigns transcription tasks to local or remote human transcribers through the transcription system's local or client transcriber user interface, and to local or remote machine transcribers through their local or remote application programming interface.

Similarly, transcriber recruiter 204 monitors whether the number of active transcribers with the necessary qualifications is expected to be sufficient to handle the immediate demand within the next minute or so 504. If not, the transcriber recruiter prompts sufficient additional qualified on-duty transcribers to respond if they are ready for immediate service 505. If, on the other hand, there are too many active transcribers, the transcriber recruiter relieves the surplus by withholding transcription tasks from them for a rest period 506. In any case, the recruiter checks again a moment later. The transcriber recruiter prompts on-duty local or remote human transcribers through the transcription system's local or client transcriber user interface, and local or remote machine transcribers through their local or remote application programming interface.

Likewise, the transcriber recruiter monitors whether enough transcribers with the requisite qualifications are scheduled to be on duty to handle the anticipated demand within the next hour or so 507. If not, the transcriber recruiter summons additional on-call transcribers as appropriate that their services will imminently be desired 508. If there are too many surplus on-duty transcribers within the safety margin, rather than being left to languish or doze off, are kept in a high state of readiness by having them perform interruptible lower-priority tasks, such as nonurgent non-realtime transcription tasks; cross-checking other transcribers' transcriptions for accuracy; and training themselves and each other for improved accuracy and speed and in the transcription skills projected to be needed most, including dialects, voice types, and noise types. Surplus on-duty transcribers beyond the safety margin are released from duty 509. In any case, the recruiter checks the on-duty pool again around once a minute. The transcriber recruiter summons on-call human transcribers, as well as human operators of time-shared systems hosting machine transcribers, through such immediate means as an automated paging call, automated telephone call, automated text message, automated instant message, or an automated signal to a background client application on the transcriber's system to notify them through their operating systems' normal notification manager. For machine transcribers on local or remote systems under the transcription system's control or in a server cloud, the transcriber recruiter uses the local or remote system programming interface to launch the transcription applications or, if they are already running, to raise their process priority.

The transcriber recruiter similarly monitors whether a sufficient number of transcribers with the required qualifications are scheduled to be on call to handle the forecast demand within the next few days 510. If not, the transcriber recruiter notifies additional registered transcribers as appropriate that it wants to engage their services and schedules them in 511. If too many are on-call, the recruiter unschedules the surplus 512. In any case, the recruiter checks the on-call pool again every hour or so. The transcriber recruiter notifies registered human transcribers and human operators of time-shared systems hosting machine transcribers by such unurgent means as an automated email message. The transcriber prepares additional notifies local and remote systems by automatically scheduling time on them, or by negotiating with their operators to do so.

In similar fashion, the recruiter monitors whether enough registered transcribers with the needed qualifications are projected to be available to handle the demand within the next few weeks or months, depending on how long it takes to train the particular skills in question 513. If not, the transcriber recruiter recruits additional candidate transcribers to register and selects the aptest registered candidates for additional training in the transcription skills projected to be in short supply 514. If there are more enrollees awaiting transcription work than the transcription system is expected to be able to provide for, the recruiter dismisses those with the least-needed skills. In any case, the recruiter rechecks the pool of registered transcribers every day or so.

The recruiter also monitors whether enough candidate transcribers are forecast to be available to replenish the supply of registered transcribers within the next few weeks or months 516. If not, then to recruit new human transcribers, the recruiter can automatically ask existing enrollees, for example by email, to let their acquaintances know about the opportunity; and if necessary, informs the transcription system's operators that additional recruiting will be needed 517. If a need for additional machine transcribers is forecast, then the recruiter can automatically inform the appropriate operators of the prospective need.

Figure 6:
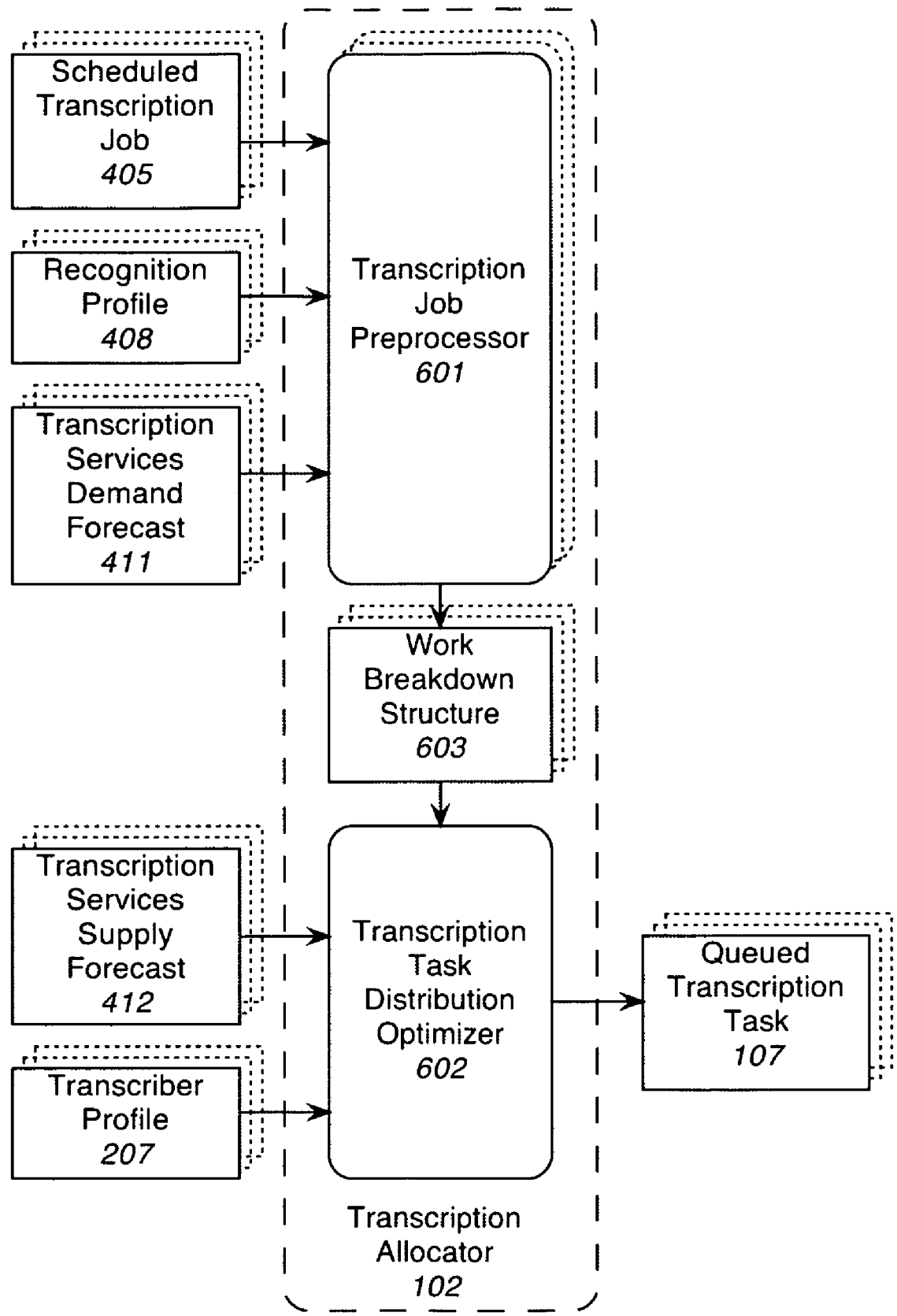
FIG. 6 is an information-flow diagram of the transcription allocator.

As shown in information-flow diagram FIG. 6, transcription allocator 102 comprises one or more transcription job preprocessors 601, and transcription task distribution optimizer 602. Transcription allocator 102 is run whenever the status of a transcriber or a transcription job changes, in order to optimize the use of the current resources for the current tasks.

A transcription job preprocessor 601 analyzes a scheduled transcription job 405, such as the transcription of part or all of a conversation, to classify the dynamic source characteristics of the speech to be transcribed according to recognition profiles 408, and divide the speech into a work breakdown structure of utterances of uniform source characteristics, removing nonuniformities where possible and permissible. The transcription job preprocessor also provides predicted work breakdown structures for transcription jobs predicted in transcription services demand forecast 411. Transcription job preprocessor 601 is described further under information flow diagram FIG. 7.

Transcription task distribution optimizer 602 takes the work breakdown structures 603 output by transcription job preprocessor 601, prioritizes and schedules them, and distributes them as classified transcription tasks 107 among multidimensional classes of transcribers and transcriber teams expected to be available according to transcription services supply forecasts 412 in such a way as to minimize cost of—and hence maximize the revenue from—providing transcription of acceptable accuracy, promptness, privacy, and security for the speech to be transcribed and in general meeting all the transcription job requirements. Since no transcriber, whether human or machine, individual or team, is completely reliable, transcription tasks are assigned to classes of transcribers, rather than to individual transcribers, lest the tasks languish beyond their promptness requirements. The task distribution optimizer enters all transcription tasks into a single queue in order of decreasing urgency, and classifies each task with multidimensional constraints on transcribers' qualifications, skills, schedules, and costs. The elements of the queue are filtered such that each transcriber is presented only the tasks appropriate to that transcriber, as determined by the transcription task distribution optimizer on the basis of transcriber profiles 207.

In general, greater accuracy, promptness, privacy, and security all cost more, and are priced accordingly. And in general, the service allotted by the transcription allocator only exceeds that paid for when and to the extent that doing so is cost-effective. The transcription task distribution optimizer may increase the accuracy of a transcription by selecting more-accurate transcribers for the given type of material; by having multiple transcribers transcribe the same utterance for cross-checking; and by having editors correct the transcription in an assembly-line team. The optimizer may increase the promptness of a transcription by selecting quicker responders and faster transcribers for the given type of material; by parceling the material out to multiple transcribers working concurrently; by employing transcription teams wherein the primary transcribers are pipelined with editors; and, in cases of extreme urgency, by redundantly having multiple transcribers race to transcribe the same material, and taking whichever transcription comes first. The optimizer may increase the privacy of a transcription by selecting machine transcribers; by selecting transcribers with no geographic or other relation to the transcribees or their business; and by dividing the material into incoherent snippets parceled out to different transcribers. The optimizer may increase the security of a transcription by selecting transcribers which have been vetted or bonded or granted security clearance; by using encrypted transmission and storage formats; and by using secure channels and transcribers and storage devices at secure locations. When using human transcribers and when using loosely integrated machine speech recognizers that do not provide access to the temporal correspondence between the speech and text, dividing the speech to be transcribed into small snippets is also useful for more-precise interleaving of voices in textual presentation and more-precise localization of speech from selected text for playback.

Many factors affect the cost of using different classes of qualified transcribers for different classes of jobs, such as the transcribers' base retention cost, cost per work-duration unit, per input unit, per output unit, peak-versus offhour cost, overtime cost, and recruitment cost; the promptness and accuracy of transcribers for the particular type of job; the number of transcribers of different skill levels available and able to perform the task; the transcribers' readiness level; the phases of regular supply and demand cycles; and, for multistage transcription such as interpreter+voicewriter+scopist, the availability of other transcribers needed to complete transcription teams. To assemble potential transcription teams for different types of transcription tasks, the transcription task distribution optimizer analyzes the types of transcribers forecast to be available according to transcription services supply forecast 412, and links them together acyclically to yield chains leading step by step from the source speech to the target transcription, which it evaluates stepwise for cost-savings. For example, the optimizer may find that no available individual transcribers are available to directly transcribe a Strine utterance at the required high accuracy, but interpreters who can rerender the utterance with a Hindi accent, dictation typists who can transcribe Hindiaccented English utterances fairly accurately, and proofreaders who can bring it up to the required accuracy are available.

Figure 7:
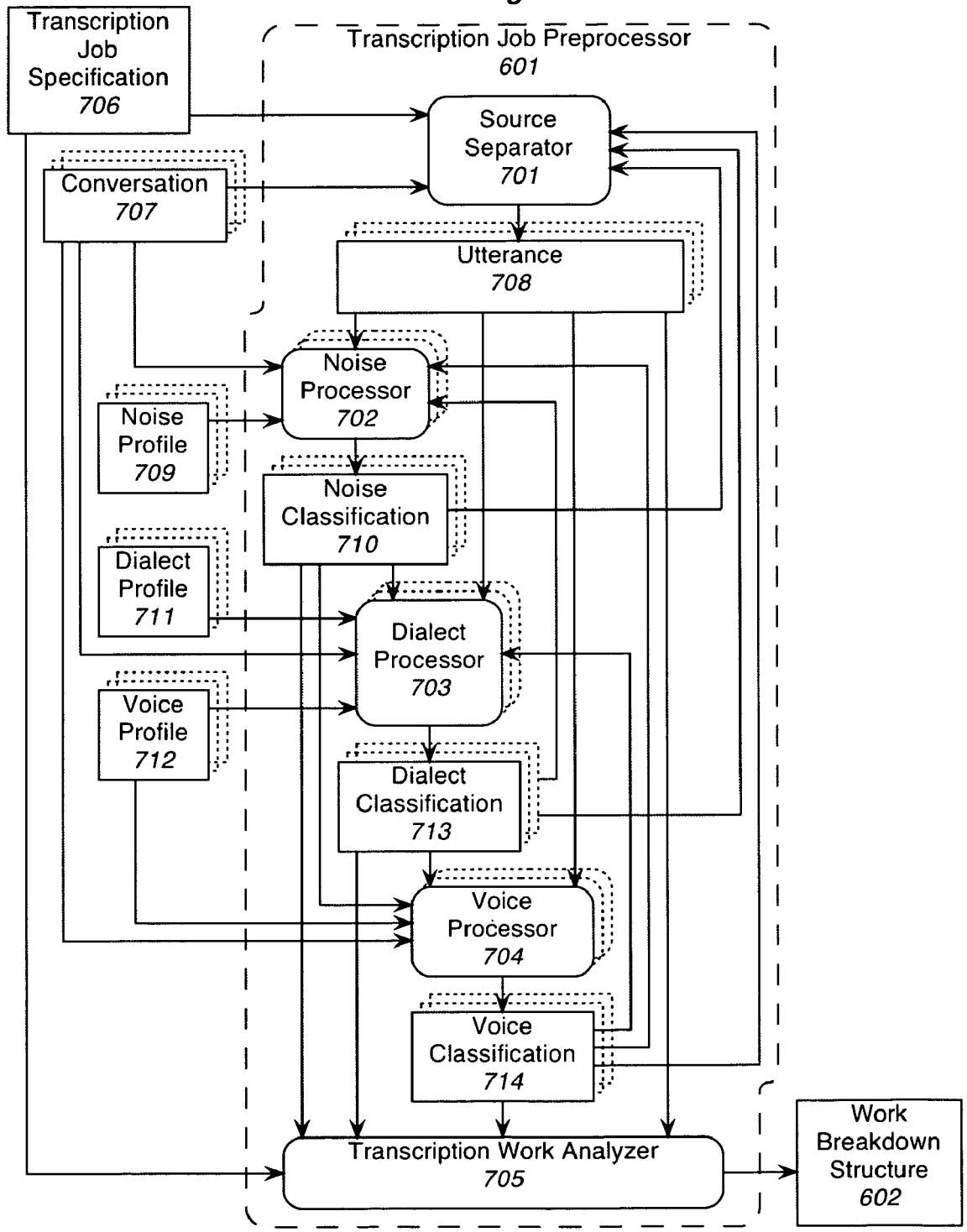
FIG. 7 is an information-flow diagram of the transcription job analyzer.

In the preferred embodiment, the transcription task distribution optimizer uses linear programming to compute the optimal allocation of transcriber resources for the known and projected tasks, employing linearizing techniques to compensate for inherent nonlinearities such as the extra per-task overhead incurred between levels of the hierarchical work breakdown structure, the per-transcriber overhead of getting accustomed to new source characteristics, and the cost of recruiting or derecruiting transcribers between readiness levels. As shown in FIG. 7, transcription job preprocessor 601 comprises source separator 701; one or more noise processors 702, dialect processors 703, and voice processors 704; and transcription work analyzer 705. Transcription job preprocessor 601 uses these components to provide utterances of uniform source characteristics for efficient transcription by transcribers skilled at transcribing speech of those source characteristics. It does this by iteratively dividing the speech specified in transcription job specification 706, such as all or part of a conversation, into a hierarchy of utterances of increasingly uniform source characteristics, output as ramified work breakdown structure 602. Where required for secrecy, the transcription job processor further divides uniform utterances into incoherently brief snippets. Transcription job specification 706 may be a scheduled transcription job 405 (FIG. 4) or a forecast transcription job 411. In a tightly integrated system, these components may be incorporated in an automatic speech recognizer generalized to separate and recognize different sound sources, including noises, dialects, and voices. To the extent possible with existing technology and in accordance with the noise-transcription, dialect-transcription, and voice-transcription requirements given in transcription job specification 706, it evens out the nonuniformities, by removing those deviations that hinder transcription in general, and by normalizing characteristics where inconsistencies hinder transcription. This normalization also serves to anonymize the source for privacy. Moreover, by normalizing to different norms for different speakers or utterances, the preprocessor can pseudonymize the source for enhanced privacy.

Noise processors 702, dialect processors 703, and voice processors 704 rely on noise profiles 709, dialect profiles 711, and voice profiles 712, respectively, for their class definitions. Since the chief purpose of these classifications is to improve transcription efficiency by facilitating the assignment of utterances containing different types of noise, dialects, and voices to transcribers who are skilled at transcribing such utterances, the profiles used to classify noises, dialects, and voices are derived by cluster analysis of the transcriber performance data 110 of different transcribers as a function of a large variety of different features of noises, dialects, and voices. The profiles corresponding to the clusters constitute a multidimensional heterarchical classification, factoring out different subclasses so that a given utterance may be simultaneously classified into a number of different more-or-less independent types of noises, dialects, and voices, with the advantage that very much less data is required to train each individual profile than would be required for a single monolithic speaker-specific profile. The cluster analysis is run iteratively as more data become available.

Source separator 701 analyzes the part of conversation 707 selected for transcription according to transcription job specification 706, and separates the audio to be transcribed into utterances 708 according to the source of each utterance. Often each speaker in a conversation between two or more speakers uses a different channel, in which case the transcriber management system separate their voices simply by recording each channel separately in the first place, as indicated in conversation record 707. Source separator 701 employs voice activity detection to dynamically determine on which line or lines people are speaking. Unless transcription job specification 706 includes silence transcription, source separator 701 omits single-channel silent passages from separated utterances 708; and unless the job specifies pause transcription, the voice separator omits general pauses from the utterances to be transcribed.

In the preferred embodiment, the transcriber management system serves as a telephone exchange bridging conversations to be transcribed, so that the system can ensure that each conversation attendee is on a separate line, even when all attendees are collocated within a single conference room. Thus clients of the transcription service can schedule a conversation through the system and have the system initiate the calls to all the attendees, or they can themselves call other attendees through the system, or attendees can call in to participate in a conversation. For outgoing phone calls, the system can provisionally identify attendees by their telephone numbers; and for incoming phone calls, the system can provisionally identify attendees by their Caller IDs, when available, and by giving each attendee a distinct pilot number to call. For communication over the Internet, attendees can provisionally be identified for incoming and outgoing calls by their IP addresses; each attendee for incoming calls can be given a distinct pilot URI to visit; and each attendee can be assigned a unique client ID automatically stored and recalled on the client's machine. In any case, the system may confirm the identity of each speaker through a greeting exchange in which the speaker is required to give a name, password, and other identifying information. Any such information is useful not just for identifying the speaker and labeling the speaker's utterances in the conversation, but also for classifying the source according to noise, dialect, and voice characteristics.

Source separator 701 omits utterances from speakers whose speech is not to be transcribed, which can occur for example if the requester specifies in transcription job specification 706 that only certain voices should be transcribed, or if certain speakers decline to have their speech transcribed for part or all of a conversation, as detailed in conversation record 707.

A noise processor 702 dynamically analyzes utterances 708 for different types of signal degradation that could interfere with transcription according to noise profiles 709, removes those types of noise it can safely remove without significantly further degrading the signal, and classifies any noise types it finds according to noise profiles 709 into noise classifications 710. Noise profiles 709 are based on cluster analysis of transcriber performance for different types of signal degradation, including additive noise such as background noises, line noise, alternating current hum, comfort noise, and crosstalk; convolutional noise such as reverberation, echo, resonance, and phase distortion; precision issues such as quantization errors, clipping, underflow, and limited bandwidth; harmonic distortion from overdriven amplifiers and other nonlinearities; and complex codec-induced signal degradation as is common in narrow-bandwidth digital transmission. When transcription allocator is run iteratively as transcription of utterances in a conversation progresses, the noise recognizers can predict the types of noise to be encountered in the same lines in utterances remaining to be transcribed. Noise processors are further aided in their classification by information identifying the source, stored in the conversation record 707. For example, the telephone country code indicates the set of telephone signals used for control and status; mobile-telephone numbers evince often severe compression artifacts; and individual previously encountered non-mobile telephones are often associated with characteristic room acoustics and ambient noises.

A dialect processor 703 dynamically analyzes utterances 708 for dialect features in the utterances that could affect their transcribability by different transcribers, according to dialect profiles 711, standardizes those potentially troublesome dialect features it can competently alter with available technology, subject to the dialect transcription requirements of job specification 706, and classifies them into dialect classifications 713, compensating for any types of noise 710 identified by noise recognizer 702. Dialect profiles 711 are based on cluster analysis of transcriber performance for different dialect features, including languages; phylogenetic, regional, ethnic, social, professional, age, and gender dialects; accents; speech styles; and specialized vocabularies. To narrow, confirm, and speed dialect classifications 713, the dialect recognizers predict the dialects used in to-be-transcribed utterances from prior information as available, including dialect classifications for other utterances in the same conversation; corrections to those classifications from already-transcribed utterances in the same conversation; dialects used in prior conversations 707 among the same attendees; dialects in common among speech profiles for the conversation attendees; telephone country codes and area codes or the physical addresses corresponding to the IP addresses of the attendees; and any pertinent information available in the attendees' profiles, including language and regional dialect, age, gender, ethnicity, profession, and relationship to other conversation attendees. Dialect classifications 713 are fed back to the noise processor 702, since the distinction between speech and noise is to some extent dialectspecific. For example, the epiglottal and pharyngeal fricatives and trills found in Haida and some Semitic dialects sound like throat-clearings to speakers of other languages; and the phonemic vocal clicks used in many southern African languages would be considered noises if appearing in speech in any other languages.

A voice processor 704 dynamically analyzes utterances 708 for voice characteristics appearing therein that could affect different transcribers' ability to transcribe them, according to voice profiles 712, normalizes any problematic voice characteristics which available technology can satisfactorily modify, in conformance with the voice transcription requirements of job specification 706, and classifies them into voice classifications 714, taking into account any types of noise 710 identified by noise recognizer 702 and dialects 713 identified by dialect recognizer 703. Voice profiles 712 are based on cluster analysis of transcriber performance for different voice characteristics including pitch ranges, voicing modes, formant ranges, articulation ranges, and timing ranges. Voice recognizers predict the voices to be transcribed from prior information as available, including voice classifications for other utterances by the same speaker and other speakers in the same conversation; corrections to those classifications from previously transcribed utterances in the conversation; voices used by the same speaker in prior conversations 707; and any potentially relevant information available in the speakers' profiles, such as age, gender, profession, diseases of the vocal apparatus, and relationship to any other attendees in the conversation. Voice classifications 714 output by voice processor 704 are fed back to dialect processor 703, since certain voice characteristics affect dialect classification; for example, a Spanish-speaking voice with a lisp could affect a classification between distincion, seseo, and ceceo dialects of Spanish. Likewise, voice classifications 714 are also fed back to noise processor 702, since certain voice characteristics affect noise classification; for example, a voice with whistled sibilants could affect the classification of whistle-like noises.

When a noise processor 702, dialect processor 703, or voice processor 704 detects signification changes in noise classification 710, dialect classification 713, or voice classification 714, respectively, they feed this information back to source separator 701 for hierarchical subdivision into smaller utterances of more-uniform characteristics. A change in dialect or voice even on a single telephone line may indicate a change in speaker, as when multiple speakers in a conference room use a speaker phone, multiple handsets are connected to a single telephone channel, or different channels are mixed in an exchange outside the system. Note that a single speaker may switch languages, dialects, accents, or styles during an utterance. Likewise, a single speaker may adopt or imitate different voices within a single utterance. For transcription jobs 706 requiring secrecy, source separator 701 breaks down longer utterances still further into snippets short enough that a transcriber transcribing only scattered snippets from a conversation will be unable to form a coherent understanding of the content.

In dividing an utterance from a single speaker, source separator 701 locates utterance boundaries during silences if possible. Otherwise, the source separator divides utterances at apparent phonological boundaries between nexuses, feet, words, or syllables, leaving enough of an overlap to ensure that the partial transcriptions can be merged into a single coherent transcription by the transcription manager.

Transcription work analyzer 705 assembles the hierarchy of utterances to be transcribed for a transcription job, along with the job specification 706, into hierarchical work breakdown structure 602 to be fed to transcription task distribution optimizer 602. Each task in the work breakdown structure specifies the specific source characteristics found in the utterance to be transcribed, including the dialects, voices, noises, and duration; along with the shared job requirements.

Figure 8:
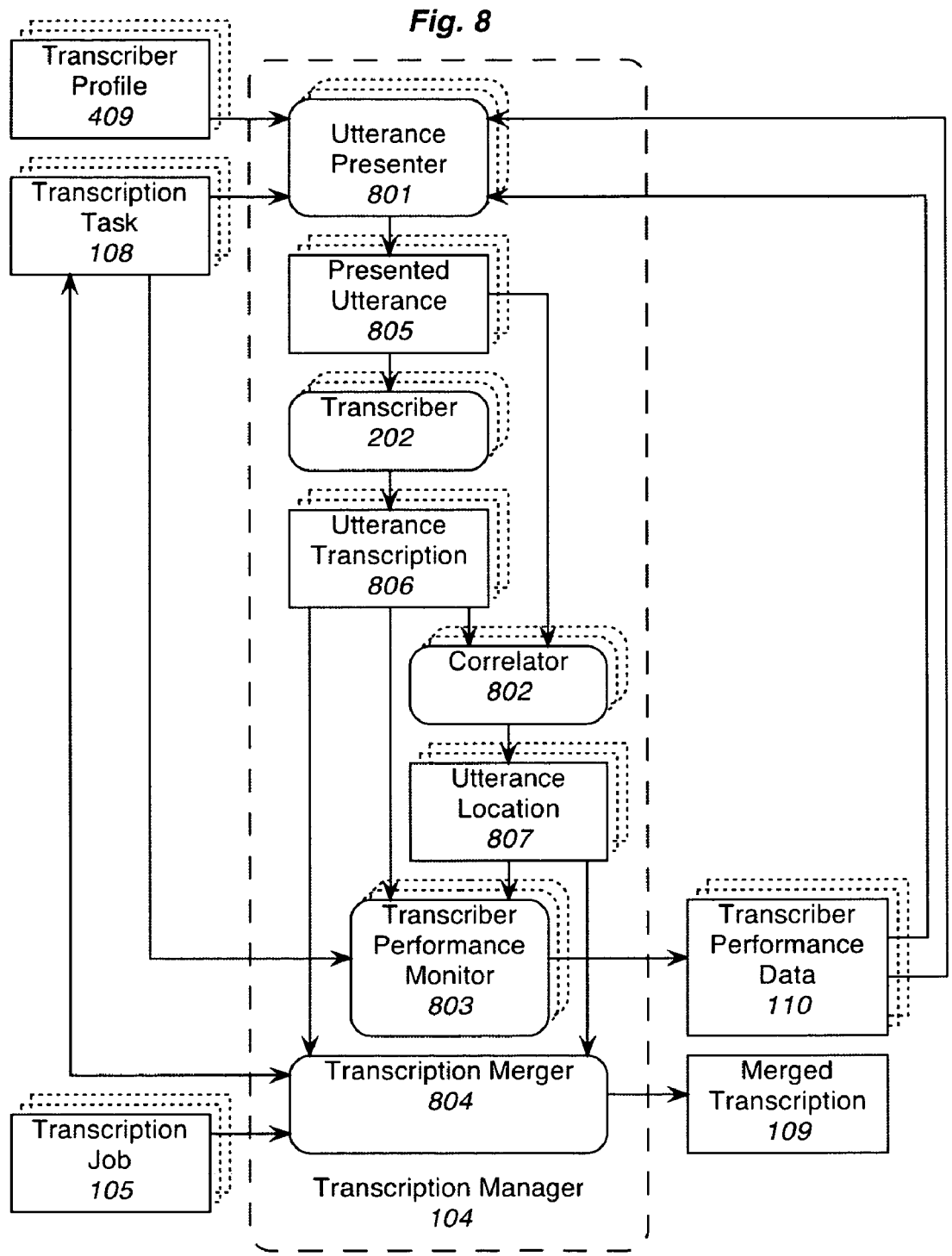
FIG. 8 is an information-flow diagram of the transcription manager.

As shown in information-flow diagram FIG. 8, transcription manager 104 comprises one or more utterance presenters 801, transcribers 202, correlators 802, and transcriber performance monitors 803; in addition to transcription merger 804.

Utterance presenter 801 presents an utterance 805 from transcription task 108 to a transcriber 202 at the optimal pace for the transcriber, as determined from the respective transcriber's profile 408, the nature of the transcription task 108, and the transcriber's performance 110 for comparable past utterances and the current utterance so far. In addition to the paced audio presentation, the utterance presenter may also present the utterance in visual forms such as a waveform and spectrogram, optionally at multiple time scales including an overview of the entire utterance, with labelled time graduations synchronized to the conversation audio, in accordance with the transcriber's preferences. The utterance presenter also presents the transcription of the utterance as the transcriber produces it, in editable form. In addition to the transcription text, the human or machine transcriber may assign confidence scores to phrases in the transcription; and in place of a transcription for unrecognized unintelligible speech, the transcriber inserts special codes marking the phrase as unrecognizable or unintelligible. For subsequent correction passes by scopists, dictation editors, proofreaders, and other editors, the utterance presenter initially presents the relevant section of merged transcription 109 from previous passes, where ambiguous or partially intelligible phrases, represented internally as an acyclic directed graph, are presented in order of decreasing score, for example as items in a pop-up menu, and questionable phrases with low confidence scores are highlighted for prospective correction. When presenting training utterances, where the correct transcription is already known from a master transcriber, from expert transcriber consensus, or from the original speaker, the correct merged transcription is initially withheld, and transcription errors are flagged for the transcriber to correct and learn from before proceeding to the next utterance. The utterance presenter permits the transcriber to select a passage in any presentation format at any time for representation of that portion of the utterance and to correct the transcription by typing, voicewriting, or in general using any available input method to insert, delete, or alter part or all of the transcription. The utterance presenter also permits the transcriber to mark a start point in the transcription, and utter or type or otherwise input an overwriting correction, letting the acoustic-phonetic matcher determine the end point. The codes for unrecognizable and unintelligible speech act as wildcards for acoustic-phonetic matching.

When a passage of a conversation containing contributions from multiple speakers is given to a single transcriber, or when the transcriber is otherwise responsible for attributing a speaker's contribution, utterance presenter 801 presents speaker identification information determined by transcription job processor 601 and stored in transcription task description 108 to the transcriber at the beginning of each change in speaker. For transcription jobs requiring privacy, the speakers identities are pseudonymized. In addition, when noise, dialect, or voice transcription is requested, the utterance presenter presents any source identification information determined by noise recognizer 702, dialect recognizer 703, and voice recognizer 704, respectively, as appropriate. Transcribers can correct any of this information, in which case the corrections are fed back to the speaker recognizer, noise recognizer, dialect recognizer, and voice recognizer, as appropriate, to adapt and improve their identification accuracy. A transcriber 202 transcribes or edits the transcription of a presented utterance 805 to produce corresponding utterance transcription 806. A transcriber 202 may be a human dictation typist or a machine speech recognizer converting the utterance directly to text; a human voicewriter reenunciating the utterance for a machine speech recognizer to convert into text; a human proofreader editing the text without reference to the audio; a human dictation editor listening to the utterance and editing the transcription; a human scopist editing the transcription with the help of a machine speech recognizer; a machine text corrector automatically flagging or correcting errors; an interpreter translating the utterance from one language, dialect, or accent to another on the fly; a human or machine translator translating the text without reference to the utterance; or any other resource that can be fruitfully employed in the process of converting the source speech into the desired transcription.

A correlator 802 compares presented utterances 805 with utterance transcriptions 806 on the fly as they are produced, and timestamps the transcription fragments in synchrony with the original audio, to produce utterance location 807, consisting of time correspondence data relating the text in utterance transcription 806 and the acoustic phonetic units in the resynthesized utterance to the corresponding acoustic phonetic units within original transcribe speech presented as presented utterance 805. For automatic speech recognizers providing such information, the correlator extracts the speech-to-text correlation information from the automatic speech recognizer. For other machine transcribers and for human transcribers, it correlates the original speech with the transcription by having a human or machine lector resynthesize the transcription and lining up the resynthesized speech with the original speech using an acoustic-phonetic matching algorithm. For better comparison of the original speech with the resynthesized speech, the acoustic-phonetic matcher compensates for the transcribee's and lector's speech characteristics by normalizing them to the extent feasible on the basis of their respective noise 710, dialect 713, and voice classifications 714.

A transcriber performance monitor 803 uses utterance location 807 the transcriber performance monitor measures and records transcriber performance data 110 for each transcriber for each transcription task 108. Transcriber performance data 110 includes such measures as the delay between presentation of a presented utterance 805 to the transcriber before the transcriber begins transcribing or repronouncing the utterance; the duration of the portion of the transcribee utterance transcribed before the transcriber pauses; how long it takes for the transcriber to transcribe or rearticulate that portion of the utterance; and the transcriber's average text output speed as a typist or machine transcriber in terms of letters or words, or the transcriber's average speaking speed as a voicewriter in terms of phones, moras, syllables or feet. In addition, by comparing the transcriptions produced by different transcribers for the same transcribee utterance, transcriber performance monitor 803 measures and records the transcriber accuracy. Transcription merger 804 assembles utterance transcriptions 806 corresponding to transcription tasks 108 belonging to a single transcription job 105 into a single coherent merged transcription 109, using utterance locations 807 to determine the position of each transcription fragment in the overall speech to be transcribed. For non-real-time transcription jobs and optionally for batch real-time jobs, to minimize cost, transcription manager 104 waits until each utterance transcription 806 is finished before feeding the completed transcription to the transcription merger. For on-the-fly real-time transcription jobs, the transcriber manager feeds the utterance transcriptions to the transcription merger 804 on the fly as they are transcribed, and transcription merger 804 merges them on the fly. For any scopists, proofreaders, and other editors viewing the merged transcription, utterance presenter 801 updates its display of the merged transcription on the fly, marking pending portions and draft portions as such, filling in ellipses and as the transcriptions for those portions arrive, and finalizing drafts as corrections arrive. For clients viewing real-time transcriptions, the presented transcription is likewise merged, updated, and corrected on the fly. As shown in data diagram FIG. 9, transcription job specification 706 comprises job scope 901, conversation identifier 902, job requirements 903, requester identifier 904, and other information 905. Job scope 901 specifies which portions of which audio channels in a conversation are to be transcribed. The conversation, part or all of which is to be transcribed, is specified by conversation identifier 902, where a conversation may be anything from a single speaker dictating a brief note or length monologue, to an ordinary telephone dialog between two speakers, to a business meeting among several speakers, to a conference involving thousands of participants. Job requirements specification 903 is described under FIG. 10. Requester identifier points to a user profile record containing the requester's contact information, billing information, transcription statistics, and other information, as described under FIG. 15.

As shown in data diagram FIG. 10, transcription job requirements record 903 comprises accuracy specification 1001, promptness specification 1002, privacy specification 1003, security specification 1004, transcriber pool 1005, transcriber preferences 1006, and other job requirements specifications 1007. In the preferred embodiment, conversations to be transcribed are stored in topically organized hierarchical folders under specific forums, and the transcription job requirements are specified along with the request for transcription, with appropriate defaults and constraints given in the requester's profile, the conversation record, the conversation folder record and those of its parents, and the conversation forum record. Accuracy specification 1001 is described further under FIG. 11; promptness specification 1002 under FIG. 12; privacy specification 1003 under FIG. 13; and security specification under FIG. 14.

Optional field transcriber pool 1005, if non-null, identifies a specific set of transcribers which the job should exclusively be transcribed by. A private pool of transcribers may be specified by clients who hire their own trusted pool of transcribers for security. Exclusive sets of transcribers are also specified by the transcriber trainer 206 for training jobs targetted for training specific transcribers.

Transcriber preferences 1006 is an optional list of preferred or exclusive transcribers for more personalized service. Preferred transcribers may be specified by clients who have established personal preferences for specific transcribers pseudonymously identified to them by the system as the authors of previous transcriptions. Accuracy specification 1001, as shown in data diagram FIG. 11, comprises quality level 1101, maximum error rate 1102, exception dictionaries 1103, and other details 1104. Defined values of quality level 1101 comprise machine, draft, and proof, and permit the requester to control the quality versus cost of the transcription. A machine transcription is produced by automatic speech recognizers without any human intervention, which with current automatic speech recognition technology is for most purposes usually unacceptably inaccurate for most new speakers, especially for the informal speech typical of telephone conversations, but improves over time as the speech recognizers adapt to the user's speech. A draft transcription is the unedited single-pass output of trained dictation typists or of trained voicewriters, which with today's automatic speech recognition technology averages 95% as accurate as a typical expert human's best effort. A proof transcript has a quantified transcription accuracy level given by maximum error rate 1102, which specifies the maximal acceptable proportion of incorrectly transcribed recognizable words in the transcription. Words which are too garbled, mumbled, masked by noise, or otherwise unintelligible by a typical expert human transcriptionist, as well as words whose spelling is indeterminate from the context, are omitted from the accuracy calculation for this purpose.

The customizable exception dictionaries 1103 list phrases, non-speech sounds, and other information to be transcribed nonliterally or omitted from the transcription, including pauses, noises, dialects, and voices. Exception dictionaries for speech sounds include expletive dictionaries, abbreviation dictionaries, and privacy dictionaries. Expletive dictionaries, used for non-verbatim clean transcripts, typically edit out vacuous fillers such as hems, haws, meaningless repetitions, and taboo phrases; as well as speech errors such as stutters and false starts; while leaving the meaning and style of the speech intact. Expletive dictionaries can speed transcription as well as improve legibility. Abbreviation dictionaries are commonly used to speed dictation or to clarify reading by transcribing a short phrase as a longer paraphrase. For example, for dictation of legal documents, which make frequent use of boilerplate text, it is often convenient for the transcribee or a transcriber to be able to utter or type a brief codephrase in proxy for entire paragraphs of standard verbiage; and for readers unfamiliar with certain jargon, an abbreviation dictionary can be used to automatically paraphrase arcane abbreviations in common terms. Privacy dictionaries are used for privacy, to pseudonymize personal names and other identifying words where they occur; and for secrecy, by disguising confidential terms. Exception dictionaries for non-speech sounds include noise dictionaries, vocalization dictionaries, dialect dictionaries, and voice dictionaries. Non-speech exception dictionaries either omit the non-speech sounds or transcribe them as descriptive editorial comments set off from speech transcription typically by encapsulating them in square brackets or presenting them in a different type style. Vocalization dictionaries typically include such non-verbal vocal sounds as hiccups, coughs, puffs, gasps, sniffles, snorts, laughs, giggles, chuckles, sneezes, throat clearings, kisses, moans, grunts, lip smacks, and idiosyncratic vocal tics. Noise dictionaries commonly include isolated nonvocal sounds, including telephone sounds such as DTMF tones, call-waiting tones, and case crackling, as well as background sounds such as door slams, chair creaks, and car horns. Dialect dictionaries specify whether and how to transcribe changes in language, dialect, accent, and style. And voice dictionaries specify whether and how to transcribe changes in voice. Speech and non-speech sounds omitted or glossed by exception dictionaries are represented internally in the transcription with non-textual codes to facilitate comparison with the original utterance for transcription pacing, merging, and correction; to permit individual viewers to choose, for example, whether to view a verbatim or clean transcript; and to permit those with the requisite privilege to view the nonanonymized or nonpseudonymized transcript.

Promptness specification 1002, as shown in FIG. 12, comprises priority level 1201, deadline 1202, and other details 1203. Defined priority levels 1201 comprise relative settings such as on-the-fly, batch real-time, high, medium, and low, as well as scheduled priorities, and permit the requester to control the speed versus cost of the transcription service. Transcription jobs submitted before or while the portion of speech to be transcribed is uttered may be specially designated as on-the-fly real-time jobs, for which transcription begins immediately, with the speech streamed to transcribers as it is still being spoken, and the transcription streamed back to the viewers as it is still being transcribed. Transcription jobs submitted immediately after the portion of speech to be transcribed has been uttered may be designated as batch real-time jobs, which are treated just like scheduled transcription jobs except that they have immediate priority. The transcriber management system handles real-time transcription efficiently even with transcribers individually incapable of real-time transcription, by dividing the speech into short snippets and distributing them to different transcribers working concurrently. Other relative transcription priority settings, such as high, medium, and low, result in transcription tasks being entered at relatively later positions in the queue. A scheduled transcription is guaranteed to be completed by specified deadline 1202, assuming that the deadline is after the end of the speech. The transcriber management system may interrupt lower-priority tasks when necessary in order to fulfill real-time transcription tasks and scheduled transcription tasks with imminent deadlines.

Ordinarily, real-time and immediate transcription are the most expensive, while progressively lower-priority and longer-term transcriptions cost progressively less, because they can utilize cheaper resources at cheaper times.

Privacy specification 1003 governs access by the transcribers and other service agents to the speech to be transcribed, its transcription, and related data. As shown in FIG. 13, the privacy specification comprises private flag 1301, secret flag 1302, user data 1303, and other details. Private flag 1301 indicates that service agents may only access the data in an anonymized or pseudonymized way that conceals or disguises the identity of the attendees to the conversation. The transcriber management system ensures privacy by using automatic speech recognition where possible; by concealing the true identities of the conversation attendees in the metadata presented to human service agents; by disguising the speakers' voices by altering their pitch ranges, voicing modes, formant ranges, timing, and other identifiable characteristics; by presenting the content where necessary only to service agent who have no known familial, business, geographical, social, medical, legal, religious, or other relationship to the conversation attendees; and by contractually binding all service agents to preserve the attendees' anonymity. Secret flag 1302 indicates that service agents may only access the data in an incoherent way that conceals its meaning. The transcriber management system ensures secrecy by likewise using automatic speech recognition where possible; by presenting the content to human service agents only in small incoherent snippets; and by contractually binding all service agents to preserve the contents' secrecy.

Security specification 1004 secures access to the speech to be transcribed, its transcription, and related data, As shown in FIG. 14, security specification 1004 comprises security classification 1401, protocol identifier 1402, key identifiers 1403, additional user data 1404, and other details 1405. Security classification 1401, if nonzero, indicates that the data is protected, and can only be accessed by those with the specified security clearance in addition to the requisite privileges, where the security levels of forum members and guests are defined by the forum administrators. Protocol identifier 1402 specifies the access barriers securing the data, such as telephone-number and IP-address restrictions, password protection, biometric identification tests, and encryption, where the corresponding passwords, biometric keys, and encryption keys are identified by key identifiers 1403. The transcriber management system further ensures security by collecting and maintaining an audit trail of all data accesses. As shown in data diagram FIG. 15, user profile 1500 comprises real name 1501, nicknames 1502, contact numbers 1143, pilot numbers 1504, user ID 1505, passwords 1506, billing information 1507, speech profiles 1508, gender 1509, birthdate 1510, transcription statistics 1511, relationships 1512, and other user-specific information 1513.

Real name 1501 is used for billing and other official communication between the system and the user. Nicknames 1502 are used, among other purposes, for identifying references to the user by other participants in conversations with the user.

Contact numbers 1503 include telephone numbers, IP addresses, email addresses, and other contact information used by the system to reach and provisionally identify the user. Pilot numbers 1504 may be used by the user to connect to the system for automatic self-identification even without Caller ID.

User ID 1505 and passwords 1506 are used for secure identification, encryption, and other security barriers. Billing information 1507 is used to bill clients for the transcription services they have used or subscribed to. User speech profiles 1508 are used for speaker recognition and voice separation; for assignment of utterances to classes of transcribers best able to transcribe their speech; and for speaker-dependent automatic speech recognition. Speech profiles 1508 comprise user-specific noise profiles, dialect profiles, and voice profiles for efficient transcription allocation; and speech profiles for specific automatic speaker-recognition systems and speaker-dependent automatic speech recognition systems. User noise profiles classify the user's speech according to types of noise associated with the user's speech that affect its ability to be transcribed by various transcribers, including additive noise such as sounds from various tools and appliances, traffic, weather, animals, background conversations, music, and other background noises in the user's environment, as well as hiss, hum, crosstalk, comfort noise, and other transmission noises; convolutional noise from the user's environment or the transmission system such as reverberation, echo, resonance, antiresonance, and phase distortion; precision issues such as coarse quantization, quantizer inaccuracy, companding, slew rate, overflow, underflow, and limited bandwidth; harmonic distortion from overdriven amplifiers and other nonlinearities; codec transform errors; and packet transmission errors; all of which may be influenced by where the user is calling from. User dialect profiles classify the user's spoken language according to features affecting its transcribability by different transcribers, including such factors as the language and dialect, accent, speech style, and jargon in their prosodic, syntactic, lexical, morphological, and phonological aspects, all of which may vary during a single discourse, and may be influenced by the region, ethnicity, class, profession, age, gender, and other characteristics of the user and other attendees to the user's conversations. User voice profiles classify the user's voice according to acoustic-phonetic features affecting different transcribers' ability to transcribe it, such as the pitch range, voicing modes, formant ranges, articulation ranges, and timing ranges. Note that a single user may have multiple speech profiles, corresponding to different languages, dialects, accents, vocabulary domains, speech styles, voices, background noises, etc.

Gender 1509 and birthdate 1510 are used to help in speaker identification, and to help in initial assignment of users' speech to transcribers before reliable speech profiles are available.

Transcription statistics 1511 track the transcription jobs requested by the user, for billing purposes and for use in predicting future demand for different types of transcription services.

Relationships 1512 specify familial relatives such as spouses, life-partners, parents, guardians, children, siblings, cousins, aunts and uncles; business relations such as employers, managers, supervisors, colleagues, employees, competitors, suppliers, clients, and customers; geographical relations such as neighbors; social relations such as friends, cronies, and enemies; medical relations such as physicians, nurses, caregivers, and patients; legal relations such as attorneys; religious relations such as priests, pastors, ministers, rabbis, imams, and gurus; and so on. Relationships, when specified, may be used by source separators 701 and transcribers 202 to help identify conversation attendees; and may be used by transcription task distribution optimizer 602 and transcription queue filters 201 for privacy from specific individuals or groups of people.

As shown in data diagram FIG. 17, a transcriber profile 0409 comprises contact information 1701, payment information 1702, skill profiles 1703, schedule 409, performance data 110, speech profiles 1704, exception dictionaries 1705, and other transcriber-specific information 1706.

Contact information 1701 is used to contact the transcriber for recruitment purposes, to transmit transcription tasks and receive transcriptions, to collect transcriber performance data 110, and to exchange other information such as transcriber preferences and schedules 0409.

Payment information 1702 is used to pay the transcriber for the transcription services the transcriber has provided for the system.

Transcriber performance data 110 records, for each transcription task handled by the transcriber, performance information such as quickness of initial response, speed of completion, rate and duration of pauses in transcription, the date and time, and, when available, the accuracy of transcription, along with a reference to the transcription task, which details the job requirements and source characteristics. Transcriber performance data 110 is used by transcriber rewarder 205 to help determine the transcriber's pay and other rewards; by transcriber trainer 206 to generate and select additional transcription tasks for training the transcriber; by transcription services supply forecaster 402 to help predict future availability of the transcriber's skills; by transcription task distribution optimizer 602 to help decide how to allocate subsequent transcription tasks; by transcription queue filter 201 to select appropriate utterances for the transcriber to transcribe; by transcription manager 104 to optimally pace utterances for the transcriber to transcribe; and by the source classifier generator to optimize classification of source noises, dialects, and voices for breaking down transcription jobs into transcription tasks suited to the transcriber.

Schedule 409 is used to record times negotiated between the transcriber and the transcriber recruiter 204 when the transcriber will be on-duty and on-call; and for transcriber status monitors to record when the transcriber is actually on duty, when the transcriber is active, and when the transcriber is busy transcribing. Transcriber schedule information 409 is used by transcriber rewarder 205 to calculate payment and other rewards; by transcription services supply forecaster 402 to forecast future availability of the transcriber; by transcription recruiter 204 to recruit the transcriber to higher or lower states of readiness as necessary to meet demand; and by transcription task distribution optimizer 602 to help decide how to allocate transcription tasks.

Skill profiles 1703 specify the types of transcription the transcriber can provide, such as interpretation, translation, voicewriting, dictation typing, scoping, or proofreading; and the types of utterances the transcriber can proficiently transcribe, as a condensed summary of transcriber performance data 110. Transcriber speech profiles 1704 are used for interpreters and voicewriters, fulfilling many of the same purposes for their rerendering of the transcribee's speech as user speech profiles 1508 do for the transcribee's original speech: for speaker recognition; for assignment of utterances to classes of transcribers best able to transcribe their speech; and for speaker-dependent automatic speech recognition.

Exception dictionaries 1705 are likewise used for interpreters and voicewriters to fulfill many of the same purposes as the exception dictionaries 1103 specified by the requester in the transcription job specification for the transcribee's speech: expletive dictionaries, abbreviation dictionaries, vocalization dictionaries, and noise dictionaries listing speech and non-speech sounds from the voicewriter and the voicewriter's environment to be transcribed nonliterally or omitted from the transcription.

The system architecture depicted in these figures and described herein is given merely as an example for the purposes of explanation. Other, equivalent architectures will be obvious to those skilled in the art.

We claim:

1. A method to improve the speed and efficiency of human and computerized speech transcription through an automated transcription management system comprising:
   monitoring automatically the queue of transcription jobs to be worked;
   allocating automatically the transcription jobs across a pool of at least one of human computerized transcribing resources;
   monitoring automatically the performance of the current pool of at least one of human and computerized transcribing resources;
   creating automatically forecasts of expected future transcribing resource needs and,
   re-adjusting, by a computing device, automatically the use of currently active transcribing resources, pools of reserve transcribing resources, and recruitment of potential future transcribing resources to meet the transcription job forecasts.

2. The method of claim 1 wherein the transcription management system reacts to one of current or expected future drops in transcription jobs by placing at least one of human and computerized transcribing resources into an off-duty state.

3. The method of claim 1 wherein the transcription management system reacts to one of current or expected future increases in transcription jobs by placing at least one of human and computerized transcribing resources who were in an on-call state into the on-duty state.

4. The method of claim 1 wherein the transcription management system reacts to one of current or expected future increases in transcription jobs by increasing the recruitment at least one of new human or new computerized transcription resources.

5. The method of claim 1 wherein the individual transcription jobs are broken into snippets for the purpose of increased at least one of overall efficiency in use of transcription resources or total speed for finishing the transcription job.

6. The method of claim 1 wherein the individual transcription jobs are broken into snippets for the purpose of increased overall security to assure that no single human or computerized transcription resource had access to any significant portion of the entire transcription job.

7. The method of claim 1 further comprising optimizing the use of specialized transcription resources in the dimensions of transcription speed, accuracy, cost, dialect, language, or security against the requirements of the current pool of transcription jobs in the system.

\* \* \* \* \*